US012579558B2

(12) United States Patent
Ding et al.

(10) Patent No.: US 12,579,558 B2
(45) Date of Patent: Mar. 17, 2026

(54) SYSTEMS AND METHODS FOR USING GRAPH NEURAL NETWORKS FOR DETECTING COMPETITORS

(71) Applicant: JPMORGAN CHASE BANK, N.A., New York, NY (US)

(72) Inventors: Wanying Ding, Sunnyvale, CA (US); Manoj Cherukumalli, San Jose, CA (US); Santosh Chikoti, Monroe Township, NJ (US); Vinay K. Chaudhri, Sunnyvale, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 7 days.

(21) Appl. No.: 18/737,278

(22) Filed: Jun. 7, 2024

(65) Prior Publication Data

US 2024/0412263 A1     Dec. 12, 2024

Related U.S. Application Data

(60) Provisional application No. 63/507,306, filed on Jun. 9, 2023.

(51) Int. Cl.
G06Q 30/0282     (2023.01)
(52) U.S. Cl.
CPC ................................. G06Q 30/0282 (2013.01)
(58) Field of Classification Search
CPC ....... G06Q 10/0833; G06Q 10/063114; G06Q 10/087
USPC ........................................................ 705/333
See application file for complete search history.

(56) References Cited

U.S. PATENT DOCUMENTS

| | | | |
|---|---|---|---|
| 11,429,927 B1 * | 8/2022 | Melancon ............ | G06Q 10/087 |
| 2019/0034694 A1 * | 1/2019 | Ross ........................ | G06T 17/00 |
| 2020/0118074 A1 * | 4/2020 | Natarajan ............ | G06Q 10/087 |
| 2022/0398528 A1 * | 12/2022 | Gupta .................. | G06Q 10/063 |
| 2022/0405775 A1 * | 12/2022 | Siebel ................ | G06Q 30/0202 |

OTHER PUBLICATIONS

"Structural Laplacian Eigenmaps for Modeling Sets of Multivariate Sequences" Published by IEEE (Year: 2014).*

* cited by examiner

*Primary Examiner* — Zeina Elchanti
(74) *Attorney, Agent, or Firm* — GREENBERG TRAURIG LLP

(57)     ABSTRACT

In some aspects, the techniques described herein relate to a method including: providing a graph neural network; and configuring the graph neural network to predict a competitor, the method comprising: receiving at least one dataset of nodes of supply chain companies, competitor companies, and customers and associated attached nodes' attributes; applying a first-order proximity to denote a local connection structure of some supply chain companies, competitor companies, and customers; applying a Laplacian Eigenmap to the first-order proximity to identify at least two positive pairs and at least two negative pairs; applying a pairwise ranking loss function that reduces the distance between the at least two positive pairs and increasing the distance between the at least two negative pairs; and based on an input identification of one company, ranking competitor companies of the company based on their Euclidean distances in the graph.

14 Claims, 3 Drawing Sheets

SYSTEMS AND METHODS FOR USING GRAPH NEURAL NETWORKS FOR DETECTING COMPETITORS

RELATED APPLICATIONS

This application claims priority to, and the benefit of, U.S. Provisional Patent Application Ser. No. 63/507,306, filed Jun. 9, 2023, the disclosure of which is hereby incorporated, by reference, in its entirety.

BACKGROUND

1. Field of the Invention

Aspects generally relate to systems and methods for using graph neural networks for detecting competitors.

2. Description of the Related Art

Knowledge graphs have become increasingly popular in recent years due to their ability to integrate, analyze, and visualize complex data in a structured and organized way. Combined with graph embedding techniques, such as graph neural networks, knowledge graphs can be a powerful tool for uncovering patterns and discovering valuable insights from the data. Current methods for finding competitors include manually sifting through data points such as company revenue, products, services, pricing strategies, marketing tactics, and industry distributions. This approach has numerous drawbacks including applicability, generalization, scalability, erroneous results, and not using relationships between companies. This disclosure uses graph neural networks for detecting competitors in the financial services industry.

Current models are unsuitable for competitor detection due to complexity and being unable to account for directed and undirected relationships, attribute nodes, and minimally annotated competitor relationships. Proposed technical solutions consistent with the present disclosure resolve issues with current models by introducing a novel model.

SUMMARY

According to some embodiments, the techniques described herein relate to a method including: providing a graph neural network; and configuring the graph neural network to predict a competitor.

According to some embodiments, the techniques described herein relate to a system comprising one or more processors and one or more storage devices storing instructions that when executed by one or more processors cause generation of a graph, the graph comprising a set of nodes and edges, the operations comprising: receiving at least one dataset of nodes of supply chain companies, competitor companies, and customers and associated attached nodes' attributes; applying a first-order proximity to denote a local connection structure of some supply chain companies, competitor companies, and customers; applying a Laplacian Eigenmap to the first-order proximity to identify at least two positive pairs and at least two negative pairs; applying a pairwise ranking loss function that reduces the distance between the at least two positive pairs and increases the distance between the at least two negative pairs; transforming the local connection structure and nodes' attributes into embeddings with a Laplacian smoothing process; reconstructing a vector of the nodes' attributes with a Laplacian sharpening process; and based on an input identification of one company, ranking competitor companies of the company based on their Euclidean distances in the graph.

According to some embodiments, the at least one dataset of supply chain companies comprises a directed edge set. According to some embodiments, the at least one dataset of competitor companies comprises an undirected edge set. According to some embodiments, the operations may further comprise, wherein after receiving an identified competitor, applying an evaluation metric based on a hit within an initial set of ranked competitor companies. According to some embodiments, the operations may further comprise, wherein after receiving an identified competitor, applying an evaluation metric based on a mean reciprocal rank of the identified competitor within the ranked competitor companies. According to some embodiments, the operations may further comprise, wherein after receiving an identified competitor, applying an evaluation metric based on a mean average precision of the identified competitor within an initial set of ranked competitor companies. According to some embodiments, the operations may further comprise implementing random nodes to be unconnected.

According to some embodiments, the techniques described herein may be implemented on a computer processing system for competitor detection using a graph, comprising a memory configured to store instructions; and a hardware processor operatively coupled to the memory for executing the instructions to execute the techniques. According to some embodiments, the techniques described herein may be implemented as a method performed by one or more computers and for generating a graph, the graph comprising a set of nodes and edges.

DETAILED DESCRIPTION

Aspects generally relate to systems and methods for using graph neural networks for detecting competitors and transactional relationships between known and unknown parties.

To address these challenges, a novel model is proposed that leverages two orders of node proximity: the first-order proximity is used to learn similarities between nodes based on labeled competitors, and the second-order proximity is used to infer competitive similarity from a supply chain network. Further, the model captures important information about the nodes and edges in the graph. To accommodate the directed nature of the supply chain network, a directed graph version of a graph convolutional network (GCN) is used to encode a graph structure and abilities. Specific Laplacian sharpening techniques are also used to reconstruct nodes' feature vectors from the embedding space. The resulting model is superior to existing models for competitor detection and transactional relationship identification.

Consistent with disclosed embodiments, a knowledge graph provides a structured and organized way to integrate, analyze, and visualize data. Further, knowledge graphs can provide valuable geometric insights. Graph Embedding is an artificial intelligence/machine learning technique that can encode nodes/edges in a knowledge graph as numerical vectors while preserving node/edge properties and graph structures, making it possible to perform computations and analysis on the graph, while Graph Neural Network is a component of graph embedding methodologies, employing neural network architecture to process and analyze graph structured data.

Consistent with disclosed embodiments, a knowledge graph is used with two types of relationships: directed Supply_To and undirected Competitor_With relationships.

Consistent with disclosed embodiments, Graph's Laplacian Matrix L is a square matrix representing a graph's topology. Given a graph with N nodes, the Laplacian Matrix is an N×N matrix defined as L=D−A, where D is the degree matrix and A is the adjacency matrix of the graph.

Consistent with disclosed embodiments, first-order proximity is implemented where connected nodes in a graph have similar properties. For a node, a weight $a_{ij}$ of the edge between $v_i$ and $v_j$ characterizes the first-order proximity. Competitor relationships can be a first-order proximity.

Consistent with disclosed embodiments, second-order proximity is implemented where nodes with similar neighborhoods should have common characteristics. The neighborhood of node vi is defined as a set of adjacent nodes $Nvi=\{V_k|a_{ik}>0, k\neq i\}$. The second order proximity between nodes $v_i$ and $v_j$ describes the similarity between their neighborhood $Nv_i$ and $Nv_j$. Supply chain relationships can be a second-order proximity.

Figure 1:
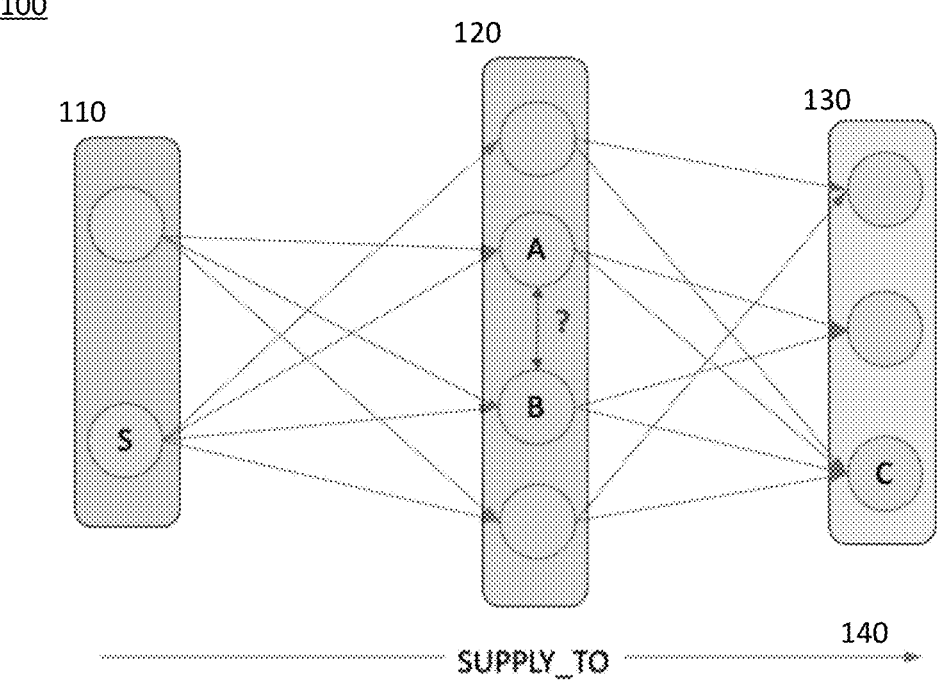
FIG. 1 is a block diagram of a knowledge graph for competitor recognition.

FIG. 1 is a block diagram of a knowledge graph for competitor recognition.

Knowledge graph 100 includes suppliers 110, companies 120, and customers 130. Supply_To direction 140 shows the direction of supply from supply chain to companies to customers.

According to some embodiments, disclosed is a computer with a processor and memory storage including instructions that when executed by the processor performs operations for generating a knowledge graph, the knowledge graph including a set of nodes and edges. According to some embodiments, the processor may be configured to detect a company A and determining it to be a competitor because of one or more shared suppliers, such as S, and/or customers, such as C, with company B. Consistent with disclosed embodiments, this knowledge graph can be disclosed as discussed herein with the use of node features, directional networks, and orders of proximity and other methods disclosed herein.

Figure 2:
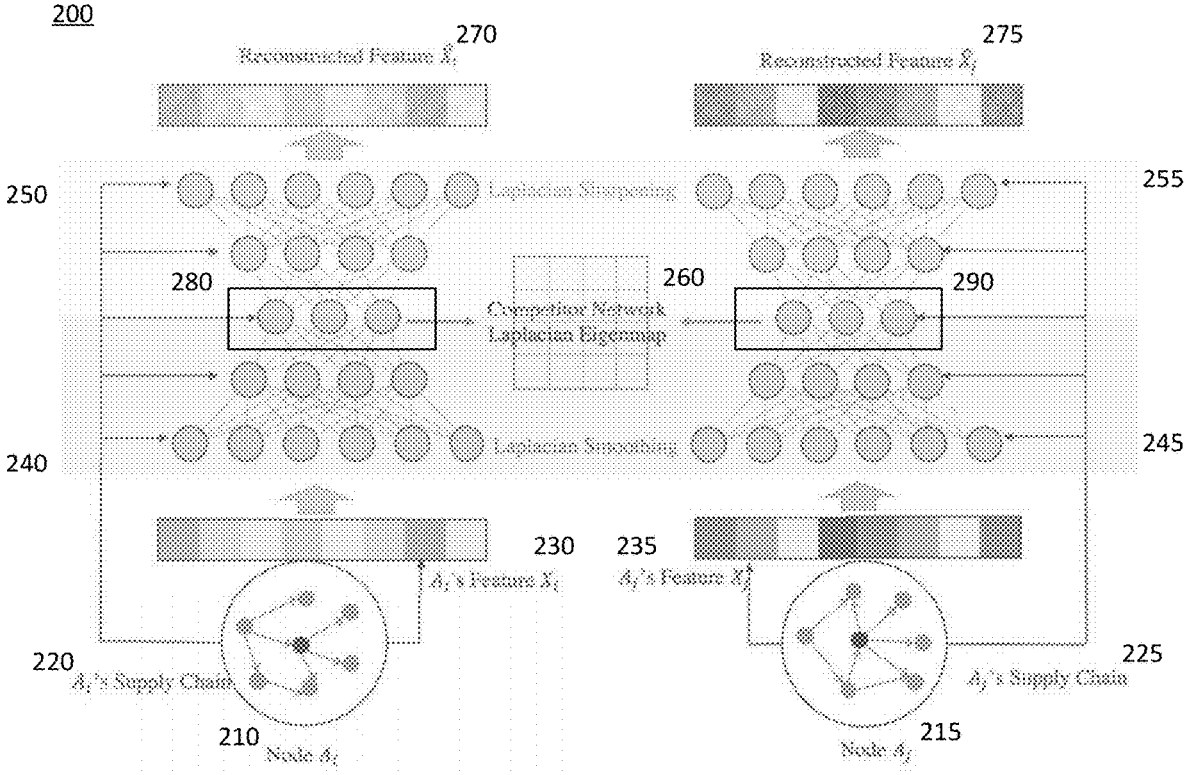
FIG. 2 is a block diagram for a model framework for competitor recognition.

FIG. 2 is a block diagram for a model framework for competitor recognition.

For the disclosed knowledge graph 200 of FIG. 2, a knowledge graph G=(V, S, C, X) is used, where V={$v_1$, $v_2$, . . . , $v_n$} is the node-set, in which each node presents a company; X=[$x_1$, $x_2$, . . . , $x_n$] is the attributes attached with each node; S={$s_1$, $s_2$, . . . , $s_m$} is a directed edge set in which each edge represents a supply chain from one company to another one that it connects; C={$c_1$, $c_2$, . . . , $c_m$} is an undirected competitor edge set, in which each edge represent a mutual competitor relationship between nodes it connects. Competitor edges may be missing in the knowledge graph, and the volume of the competitor edge set can be much smaller than that of the supply chain edge set, e.g., |C|<<|S|. The disclosed system can leverage limited competitor edges together with the relatively large supply chain graph (graph structure and attributes) to find more potential competitor edges.

As disclosed in FIG. 2, the processor may be configured to receive at least a pair of companies 210, 215, their related supply chain networks 220, 225 and associated attached nodes' attributes 230, 235.

As further disclosed in FIG. 2, the processor may be configured to apply a first-order proximity to denote a local connection structure 260 competitor companies. Next, the processor may be configured to apply a Laplacian Eigenmap to the first-order proximity to preserve their local connection. Next, the processor may be configured to apply a pairwise ranking loss function that reduces the distance between the positive pair of competitors and increases the distance between the negative pairs, which are known non-competitors.

As further disclosed in FIG. 2, the processor may be configured to transform the local connection structure and nodes' attributes into embeddings 280, 290, with a Laplacian smoothing process 240, 245. Next, the processor may be configured to transform a vector of the nodes' attributes with a Laplacian sharpening process 250, 255. The end results may be transformed features 270, 275. Next, the processor minimizes the mean error between 230 and 270, and between 225 and 270 to ensure the embeddings (280, 290) have maximally preserved the structure and attribute information for the input nodes 210, 215.

Finally, for model inference, based on an input identification of one company, rank competitor companies of the company based on their Euclidean distances in the graph.

According to some embodiments, the processor may be configured to implement knowledge graph 200 with two orders of proximity. The processor may be configured to implement knowledge graph 200 with a Laplacian Eigenmap to preserve the intrinsic competition structure from the competitor network when mapping it to a lower-dimensional space. Further, a stacked autoencoder framework is applied to map the supply chain network to the lower-dimensional space. Further, the autoencoder uses a directed graph version of a GCN, a Laplacian smoothing process, to transform both the graph structure and node attributes into embeddings. Additionally, a Laplacian sharpening process, inverse to the directed graph version of the GCN autoencoder, is then applied to reconstruct the nodes' attribute vectors.

According to some embodiments, the processor may be configured to find a first order proximity using a Laplacian Eigenmap on a competitor network. According to some embodiments, the processor may be configured to retrieve a database of competitor relationships and express those relationships as:

$$C = \begin{cases} w_{i,j} & \text{if } i \neq j \\ 0 & \text{otherwise} \end{cases} \quad (1)$$

where $w_{ij}=1$ if node i and node j are known competitors, $w_{i,j}=-1$ if they are known non-competitors, otherwise $w_{i,j}=0$.

According to some embodiments, the processor may implement a Laplacian Eigenmap to enforce proximity between competitive nodes. The Laplacian Eigenmap can reflect the local structure of the graph and maintain relationship between nodes. The processor may construct a graph Laplacian matrix L, which is a matrix representation of the graph's structure. Then, the Laplacian matrix is used to capture the graph's underlying structure. The Laplacian Eigenmap is learned by minimizing the objective function described in the below equation 2 to enforce that nodes connected to the graph stay relatively close after embedding.

$$\min_{Y} \sum_{i,j} w_{i,j}(y_i - y_j)^2 = 2tr(Y^T L Y) \quad (2)$$

where L is the graph's Laplacian matrix, $w_{ij}$ is the non-negative weights, tr($\cdot$) is the trace of a matrix, and $$Y = \{yi\}\frac{N}{i=1},$$

indicating the embeddings of nodes in the graph.

Equation 2 considers positive samples, but negative samples also can be considered and should be distinguished. separate objective functions for positive samples (Equation 3) and negative samples (Equation 4) based on Equation 2. It is worth noting that negative samples' weights $w_{i,j}$ are negative values in the graph (Equation 1), while Laplacian Eigenmap (Equation 2) only accepts non-negative weights. To address this, we used the opposite values,$-w_{i,j}$, as demonstrated in Equation 4.

$$\mathcal{L}_{pos} = \sum_{i,j=1}^{N} w_{i,j}^{+}\|y_i - y_j\| = 2tr(Y^T L^+ Y) \tag{3}$$

$$\mathcal{L}_{neg} = \sum_{i,j=1}^{N} -w_{i,j}^{-}\|y_i - y_j\| = 2tr(Y^T L^- Y) \tag{4}$$

where L+ is the Laplacian matrix for nodes in positive samples, and L− is for nodes in negative samples.

According to some embodiments, the processor may implement a pairwise ranking loss function (Equation 5) to minimize the distance between positive pairs and simultaneously maximizing the distance between negative pairs. In this equation, the hyper-parameter m represents the margin, which controls the desired separation between positive and negative pairs.

$$\mathcal{L}_{1st} = \mathcal{L}_{pos} + \max(0, m - \mathcal{L}_{neg}) \tag{5}$$

According to some embodiments, the processor may be configured to find a second order proximity using a Laplacian Autoencoder on a supply chain network. According to some embodiments, the processor may be configured to retrieve a database of directed relationships and operate on directed graphs by following a propagation rule shown in Equation 7

$$Y^{(l+1)} = \sigma\left(\tilde{D}^{-1}\tilde{A}Y^{(l)}W^{(l)}\right) \tag{7}$$

where A~=A+I is the adjacency matrix of the graph with added self-connection. I is the identity matrix, $\overline{D}=\Sigma_j \tilde{A}_{ij}$ is the degree matrix, and W(l) is layer-specific trainable weight matrix, $\sigma(\cdot)$ denotes an activation function. $Y^{(l)} \in \mathbb{R}^{N\times D}$ is hidden representations in the $l^{th}$ layer. This function is adapted from the undirected version of GCN model whose propagation rule is:

$$Y^{(l+1)} = \sigma\left(\tilde{D}^{-1/2}\tilde{A}\tilde{D}^{-1/2}Y^{(l)}W^{(l)}\right) \tag{6}$$

The processor can change the normalization function, $\tilde{D}^{-1/2}\tilde{A}\tilde{D}^{-1/2}$ to $\tilde{D}^{-1}\tilde{A}$, which takes into account the degree of the starting node of each edge. By changing the normalization function, the propagation rule of GCN can be rewritten as Equation According to some embodiments, the processor may be configured to obtain node embeddings Y with two layers of encoding followed by Equation 7. Since some or most competitor edges are missing, a decoder is used to enhance the model's ability to extract information from the supply chain graph to aid in competitor detection. Since GCN can be viewed as a Laplacian smoothing process, we can employ a Laplacian sharpening process to reverse the encoding process. Equation 8 represents a Laplacian sharpening method to reverse the undirected GCN process and reconstruct nodes' attribute vector by following Equation 8:

$$Y^{(m+1)} = \sigma\left(\left(\hat{D}^{-1/2}\hat{A}\hat{D}^{-1/2}\right)Y^{(m)}W^{(m)}\right) \tag{8}$$

where $Y^{(m)}$ is the matrix of the hidden representations in the $m^{th}$ layer of the decoder, $\hat{D}=2I_n+D$ and $\hat{A}=2I_n-A$.

According to some embodiments, the processor may be configured to adapt Equation 8 on a directed graph. The processor may be configured to enact Equation 9 as the decoder to increase and/or maximize the information extraction capability of the model by reconstructing the original data from the supply chain network.

$$Y^{(m+1)} = \sigma\left(\left(\hat{D}^{-1}\hat{A}\right)Y^{(m)}W^{(m)}\right) \tag{9}$$

According to some embodiments, the processor may be configured to minimize the difference between the original node feature vector and the reconstructed one, which can be formulated as Equation 10:

$$L_{2nd} = \left\|X - \hat{X}\right\|_2^2 \tag{10}$$

According to some embodiments, the processor may be configured to integrate the loss function derived from both the first-order and second-order proximity, and can be mathematically represented as Equation 11.

$$L = L_{1st} + \beta L_{2nd} + \lambda W^2 \tag{11}$$

where $\beta$ is a hyper parameter to balance the first-order and second-order losses, $\lambda W^2$ is the regularization term.

According to some embodiments, the processor may be configured to retrieve data from databases including financial entities (e.g., companies, investors, bankers, etc.) and relationships (e.g., supply chain, investment) among them.

According to some embodiments, the processor may be configured to: (1) based on an input of a company, identify its competitors and/or (2) based on an input of two companies, determine whether they are competitors. For (1), the processor may be configured to determine a probability or score that a prospective company is a competitor of the input company. This can be done, for example, by computing the similarity/distance between the embeddings once the model has been generated consistent with disclosed embodiments. The distance may be a Euclidean distance. Evaluation metrics may also be used including a number of hits, a mean reciprocal, and a mean average precision.

According to some embodiments, the processor may be configured to calculate hits by calculating the rate of correct items appearing in each instance list's top K entries, calculated as Equation 12, where $C_i$ counts the number of correct items in the top K entries, i stands for each instance, and N is the total number of instances.

$$\text{Hits} = \frac{1}{N}\sum_{i}^{N}\frac{C_i}{K} \tag{12}$$

According to some embodiments, the processor may be configured to calculate mean reciprocal rank by determining the first correct item among the top K ranked items, calculated as Equation 13, where r is the rank of the first correct item among the top K ranked items.

$$MRR = \frac{1}{N}\sum_{i}^{N}\frac{1}{r_i} \tag{13}$$

According to some embodiments, the processor may be configured to calculate mean average precision by calculating the average precision across a set of items, calculated as Equation 14, where P(k) indicates the precision at cut-off k in the list and rel(k) equals 1 if the item at rank k is a correct item, otherwise 0.

$$MAP = \frac{1}{N}\sum_{k=1}^{K}(P(k)*rel(k)) \tag{14}$$

According to some embodiments, one or more of these evaluation metrics can be used, each of the metrics providing a distinct angle of assessment. Hits metric evaluates whether a method can successfully identify the correct items no matter where they are positioned, MRR metric measures the position of the first correct match, while MAP metric evaluates the ability of a method to prioritize the correct items over the others.

According to some embodiments, the processor may be configured to determine whether two companies are competitors or not by concatenating the embeddings of the two nodes and using the concatenated embedding as input for a logistic regression model.

According to some embodiments, the processor may be configured to determine a classifier that uncovers complex patterns and relationships within the data. An advanced classifier can be a classifier that only use linear regression. An advanced classifier may use more complicated logic in its classifications.

Figure 3:
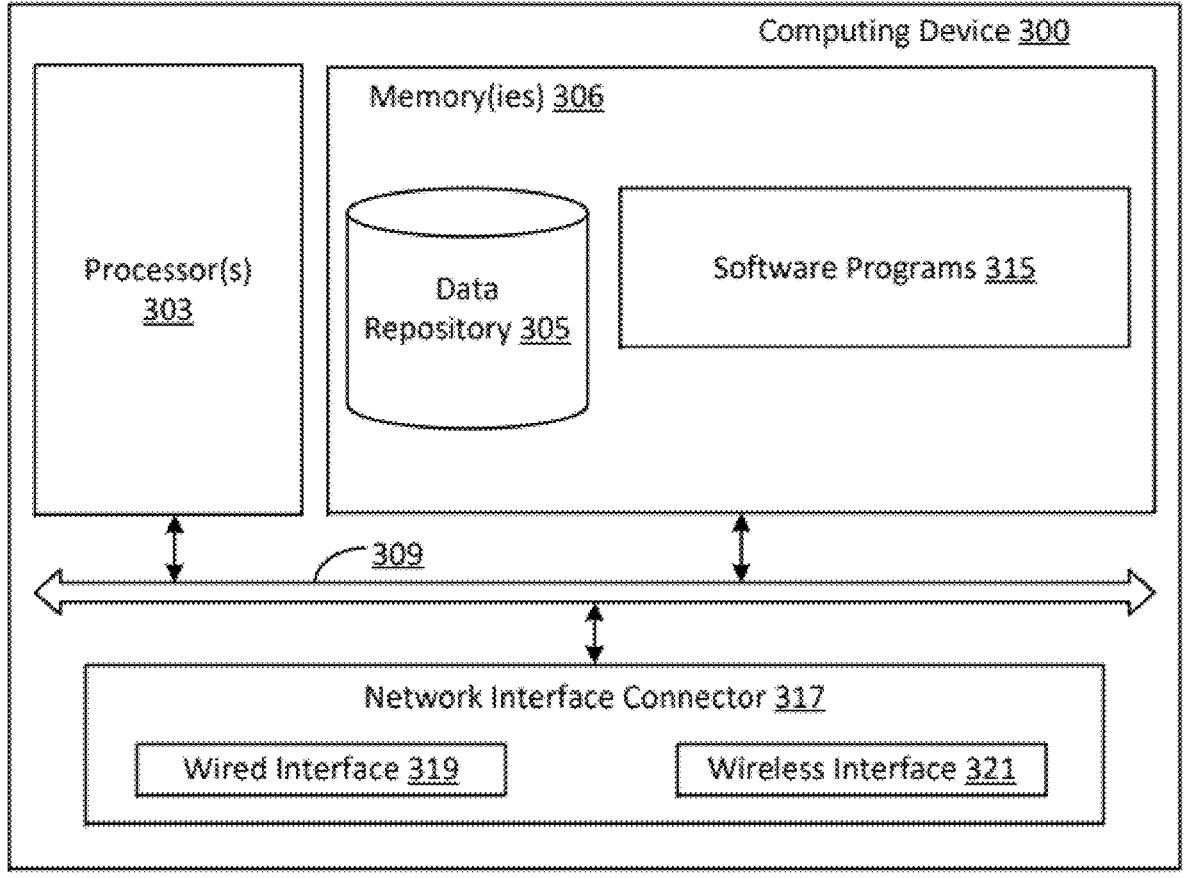
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such as a BiD-STM Engine, a ML model engine, an interface, various database engines and database servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device", "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A system comprising one or more processors and one or more storage devices storing instructions that when executed by one or more processors cause generation of a graph, the graph comprising a set of nodes and edges, the operations comprising:

receiving at least one dataset of nodes of supply chain companies, competitor companies, and customers and associated attached nodes' attributes;

applying a first-order proximity to denote a local connection structure of some supply chain companies, competitor companies, and customers;

applying a Laplacian Eigenmap to the first-order proximity to identify at least two positive pairs and at least two negative pairs;

applying a pairwise ranking loss function that reduces the distance between the at least two positive pairs and increases the distance between the at least two negative pairs;

transforming the local connection structure and nodes' attributes into embeddings with a Laplacian smoothing process;

reconstructing a vector of the nodes' attributes with a Laplacian sharpening process; and based on an input identification of one company, ranking competitor companies of the company based on their Euclidean distances in the graph.

2. The operations of claim 1, wherein the at least one dataset of supply chain companies comprises a directed edge set.

3. The operations of claim 1, wherein the at least one dataset of competitor companies comprises an undirected edge set.

4. The operations of claim 1, further comprising, wherein after receiving an identified competitor, applying an evaluation metric based on a mean reciprocal rank of the identified competitor within the ranked competitor companies.

5. The operations of claim 1, further comprising implementing random nodes to be unconnected.

6. A method performed by one or more computers and for generating a graph, the graph comprising a set of nodes and edges, the method comprising:

receiving at least one dataset of nodes of supply chain companies, competitor companies, and customers and associated attached nodes' attributes;

applying a first-order proximity to denote a local connection structure of some supply chain companies, competitor companies, and customers;

applying a Laplacian Eigenmap to the first-order proximity to identify at least two positive pairs and at least two negative pairs;

applying a pairwise ranking loss function that reduces the distance between the at least two positive pairs and increases the distance between the at least two negative pairs;

transforming the local connection structure and nodes' attributes into embeddings with a Laplacian smoothing process;

reconstructing a vector of the nodes' attributes with a Laplacian sharpening process; and based on an input identification of one company, ranking competitor companies of the company based on their Euclidean distances in the graph.

7. The method of claim 6, wherein the at least one dataset of supply chain companies comprises a directed edge set.

8. The method of claim 6, wherein the at least one dataset of competitor companies comprises an undirected edge set.

9. The method of claim 6, further comprising, wherein after receiving an identified competitor, applying an evaluation metric based on a mean reciprocal rank of the identified competitor within the ranked competitor companies.

10. The system of claim 6, further comprising implementing random nodes to be unconnected.

11. A computer processing system for competitor detection using a graph, comprising:

a memory configured to store instructions; and a hardware processor operatively coupled to the memory for executing the instructions to:

receive at least one dataset of nodes of supply chain companies, competitor companies, and customers and associated attached nodes' attributes;

apply a first-order proximity to denote a local connection structure of some supply chain companies, competitor companies, and customers;

apply a Laplacian Eigenmap to the first-order proximity to identify at least two positive pairs and at least two negative pairs;

apply a pairwise ranking loss function that reduces the distance between the at least two positive pairs and increases the distance between the at least two negative pairs;

transform the local connection structure and nodes' attributes into embeddings with a Laplacian smoothing process;

reconstruct a vector of the nodes' attributes with a Laplacian sharpening process; and based on an input identification of one company, rank competitor companies of the company based on their Euclidean distances in the graph.

12. The system of claim 11, wherein the at least one dataset of supply chain companies comprises a directed edge set.

13. The system of claim 11, wherein the at least one dataset of competitor companies comprises an undirected edge set.

14. The system of claim 11, the instructions further comprising, wherein after receiving an identified competitor, applying an evaluation metric based on a mean reciprocal rank of the identified competitor within the ranked competitor companies.

<div align="center">*    *    *    *    *</div>